US012580261B2

(12) United States Patent
Park et al.

(10) Patent No.: US 12,580,261 B2
(45) Date of Patent: Mar. 17, 2026

(54) BATTERY MODULE AND BATTERY PACK INCLUDING THE SAME

(71) Applicant: LG ENERGY SOLUTION, LTD., Seoul (KR)

(72) Inventors: Subin Park, Daejeon (KR); Junyeob Seong, Daejeon (KR); Won Kyoung Park, Daejeon (KR); Honggoo Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 830 days.

(21) Appl. No.: 17/796,607

(22) PCT Filed: Nov. 4, 2021

(86) PCT No.: PCT/KR2021/015948

§ 371 (c)(1),
(2) Date: Jul. 29, 2022

(87) PCT Pub. No.: WO2022/124584

PCT Pub. Date: Jun. 16, 2022

(65) Prior Publication Data

US 2023/0352787 A1     Nov. 2, 2023

(30) Foreign Application Priority Data

Dec. 8, 2020     (KR) ........................ 10-2020-0170442

(51) Int. Cl.
H01M 50/242 (2021.01)
H01M 10/653 (2014.01)
H01M 50/211 (2021.01)

(52) U.S. Cl.
CPC ....... H01M 50/242 (2021.01); H01M 10/653 (2015.04); H01M 50/211 (2021.01)

(58) Field of Classification Search
CPC ............ H01M 50/242; H01M 10/653; H01M 50/211; H01M 10/617; H01M 2220/20; H01M 10/613; H01M 50/209; Y02E 60/10
See application file for complete search history.

(56) References Cited

U.S. PATENT DOCUMENTS

2013/0004822 A1     1/2013   Hashimoto et al.
2015/0214583 A1     7/2015   Lim et al.
(Continued)

FOREIGN PATENT DOCUMENTS

CN          102856516 A      1/2013
CN          110915019 A      3/2020
(Continued)

OTHER PUBLICATIONS

Extended European Search Report for European Application No. 21903631.6, dated May 8, 2024.
(Continued)

*Primary Examiner* — Kaity V Chandler
(74) *Attorney, Agent, or Firm* — Birch, Stewart, Kolasch & Birch, LLP

(57) ABSTRACT

A battery module includes a battery cell stack containing a plurality of battery cells stacked along a first direction; and an exterior member that wraps the outer surface of the battery cell stack, in which a central portion of the lower surface of the battery cell stack is opened, wherein one end part of the exterior member is attached to one side part of the lower surface of the battery cell stack, and wherein the other end part of the exterior member is attached to the other side part of the lower surface of the battery cell stack.

13 Claims, 9 Drawing Sheets

(56) References Cited

U.S. PATENT DOCUMENTS

| | | | |
|---|---|---|---|
| 2017/0047562 A1 | 2/2017 | Ogawa et al. | |
| 2017/0190264 A1 | 7/2017 | Kim et al. | |
| 2018/0062127 A1 | 3/2018 | Lee et al. | |
| 2018/0375077 A1 | 12/2018 | Shin et al. | |
| 2019/0131596 A1 | 5/2019 | Yang et al. | |
| 2019/0198952 A1 | 6/2019 | Choi et al. | |
| 2019/0326569 A1 | 10/2019 | Chi et al. | |
| 2020/0067038 A1 | 2/2020 | Chi et al. | |
| 2020/0067040 A1* | 2/2020 | Kim | H01M 10/486 |
| 2020/0106058 A1 | 4/2020 | Kim | |
| 2020/0259140 A1 | 8/2020 | Lee et al. | |
| 2020/0259155 A1* | 8/2020 | Lee | H01M 10/425 |
| 2020/0343499 A1 | 10/2020 | Yoo et al. | |
| 2020/0388805 A1 | 12/2020 | Yoo et al. | |
| 2021/0028423 A1 | 1/2021 | Shin et al. | |
| 2021/0057689 A1 | 2/2021 | Park et al. | |
| 2021/0069536 A1* | 3/2021 | Kim | A62C 99/0018 |
| 2021/0328284 A1 | 10/2021 | Kim | |

FOREIGN PATENT DOCUMENTS

| | | | | | |
|---|---|---|---|---|---|
| CN | 111670516 A | 9/2020 | | | |
| DE | 10 2010 013 034 A1 | 9/2011 | | | |
| EP | 2 541 668 A1 | 1/2013 | | | |
| EP | 3 694 019 A1 | 8/2020 | | | |
| JP | 2-14666 U | 1/1990 | | | |
| JP | 2013-12441 A | 1/2013 | | | |
| JP | 2015082354 A | * | 4/2015 | | Y02E 60/10 |
| JP | 2016-213104 A | | 12/2016 | | |
| JP | 2017-37789 A | | 2/2017 | | |
| JP | 2018-163732 A | | 10/2018 | | |
| JP | 2019-197647 A | | 11/2019 | | |
| JP | 2020004529 A | * | 1/2020 | | Y02E 60/10 |
| JP | 2020-513666 A | | 5/2020 | | |
| KR | 10-2014-0077811 A | | 6/2014 | | |
| KR | 10-2015-0085951 A | | 7/2015 | | |
| KR | 10-2015-0089483 A | | 8/2015 | | |
| KR | 10-2017-0082041 A | | 7/2017 | | |
| KR | 10-2018-0020547 A | | 2/2018 | | |
| KR | 10-2018-0113906 A | | 10/2018 | | |
| KR | 10-2019-0063809 A | | 6/2019 | | |
| KR | 10-2019-0078521 A | | 7/2019 | | |
| KR | 10-2018301 B1 | | 9/2019 | | |
| KR | 10-2020-0015207 B | | 2/2020 | | |
| KR | 20200015207 A | * | 2/2020 | | H01M 10/613 |
| KR | 10-2020-0086907 A | | 7/2020 | | |
| KR | 20210066527 A | * | 6/2021 | | H01M 10/625 |
| WO | WO 2020/055219 A1 | | 3/2020 | | |

OTHER PUBLICATIONS

International Search Report for PCT/KR2021/015948 mailed on Mar. 2, 2022.

Written Opinion of the International Searching Authority for PCT/KR2021/015948 mailed on Mar. 2, 2022.

* cited by examiner

【FIG. 1】
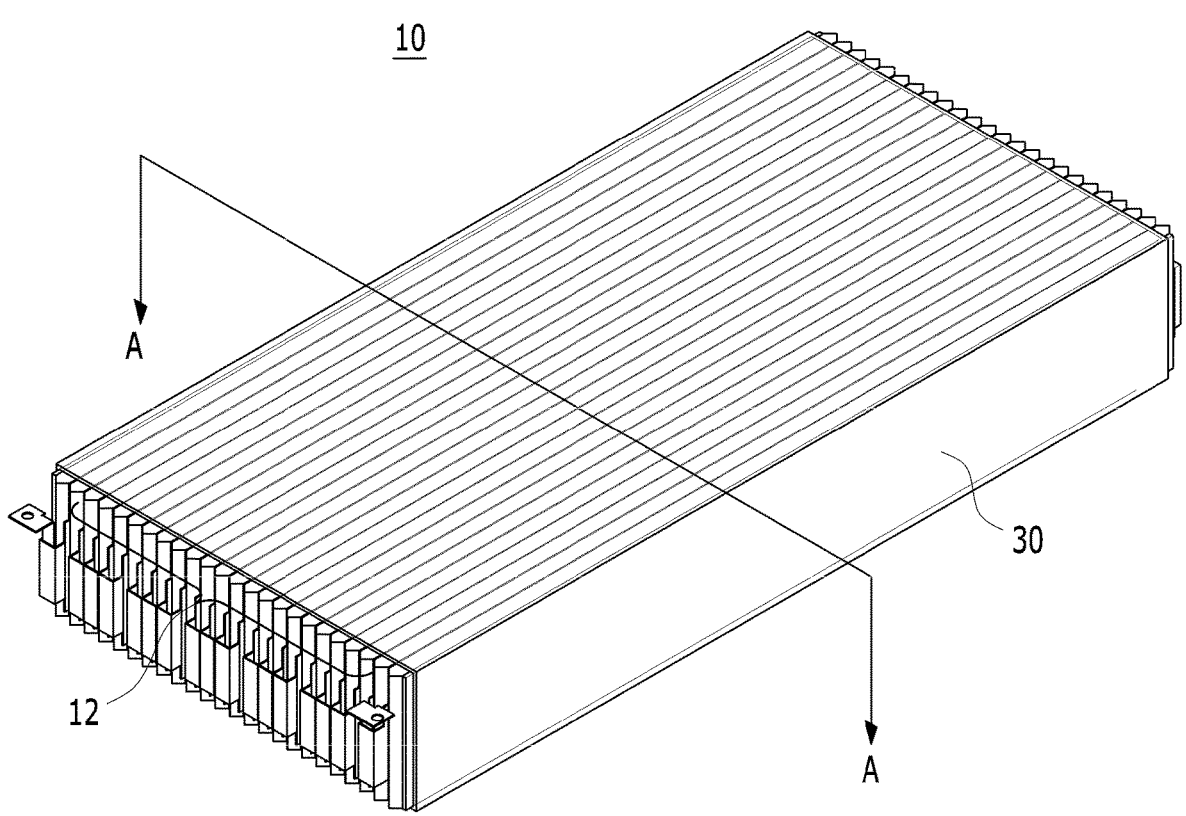
10
A
A
12
30
Conventional Art

【FIG. 2】
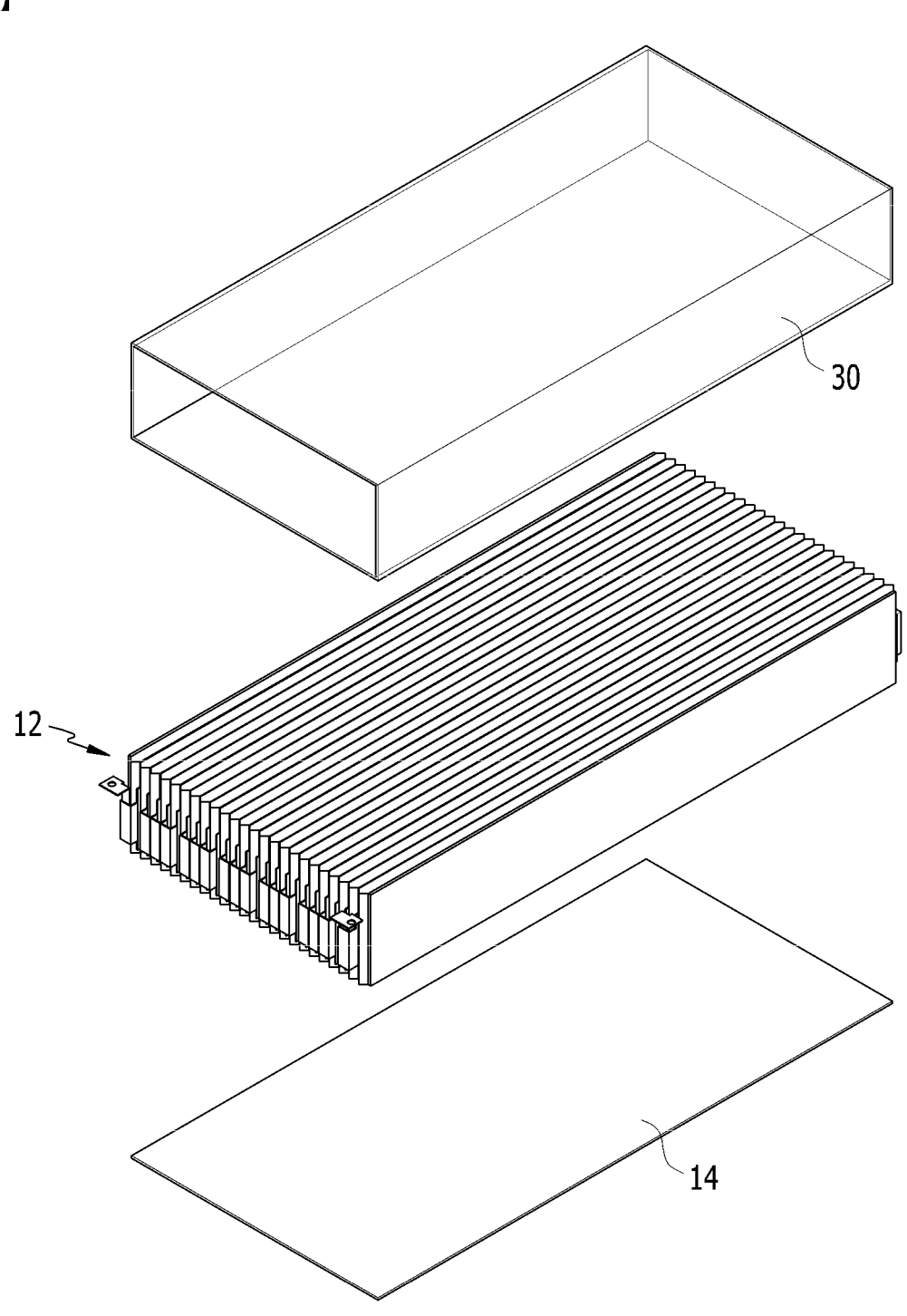
Conventional Art

【FIG. 3】
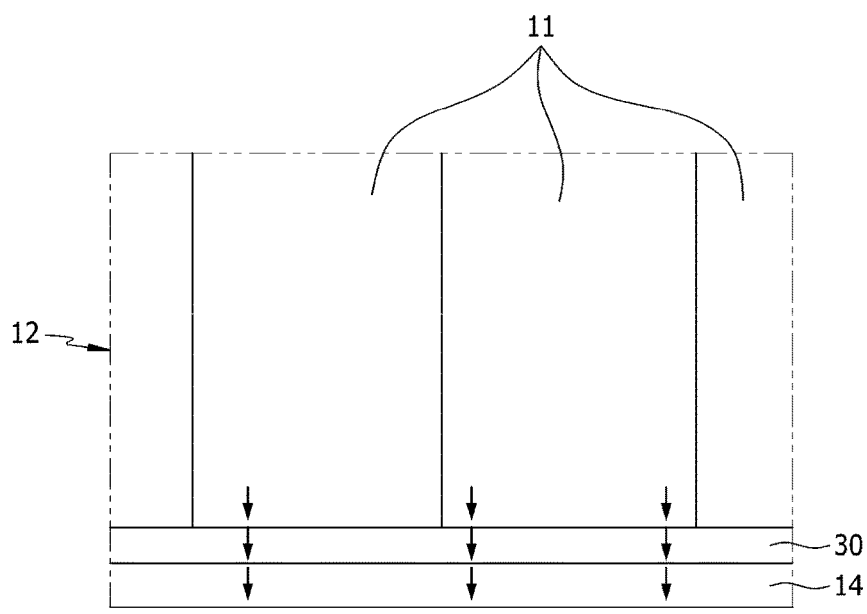
Conventional Art
【FIG. 4】
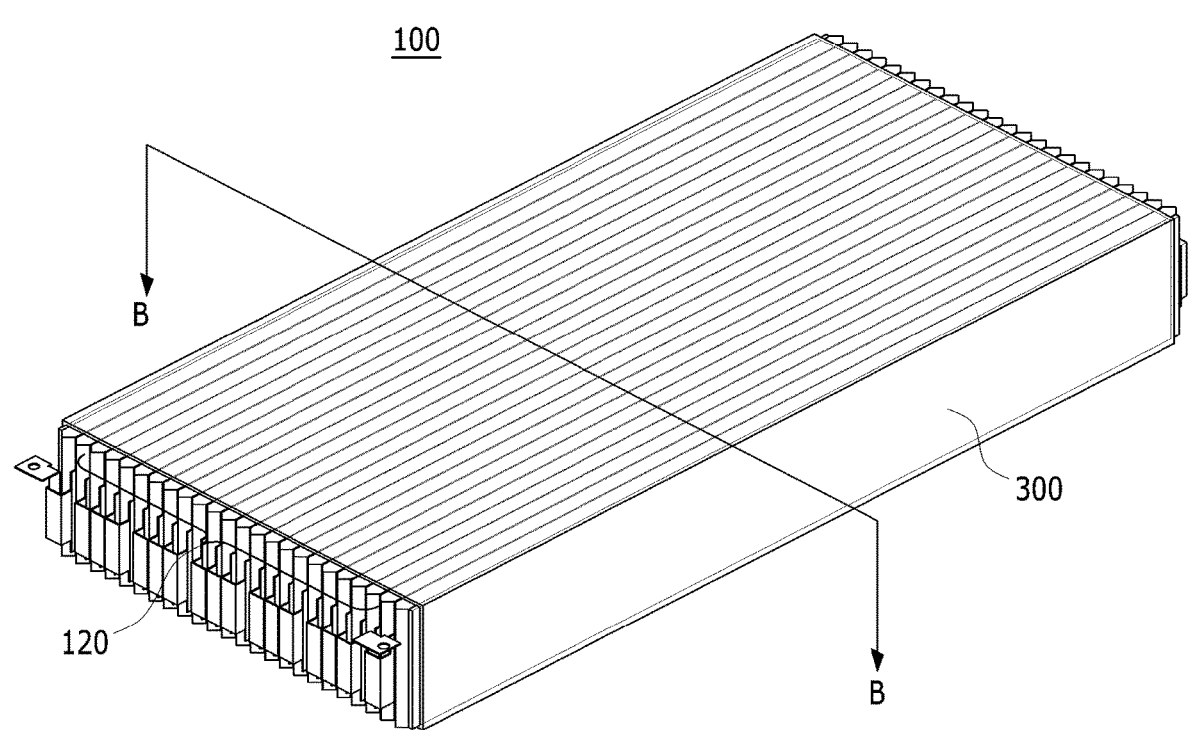

【FIG. 5】
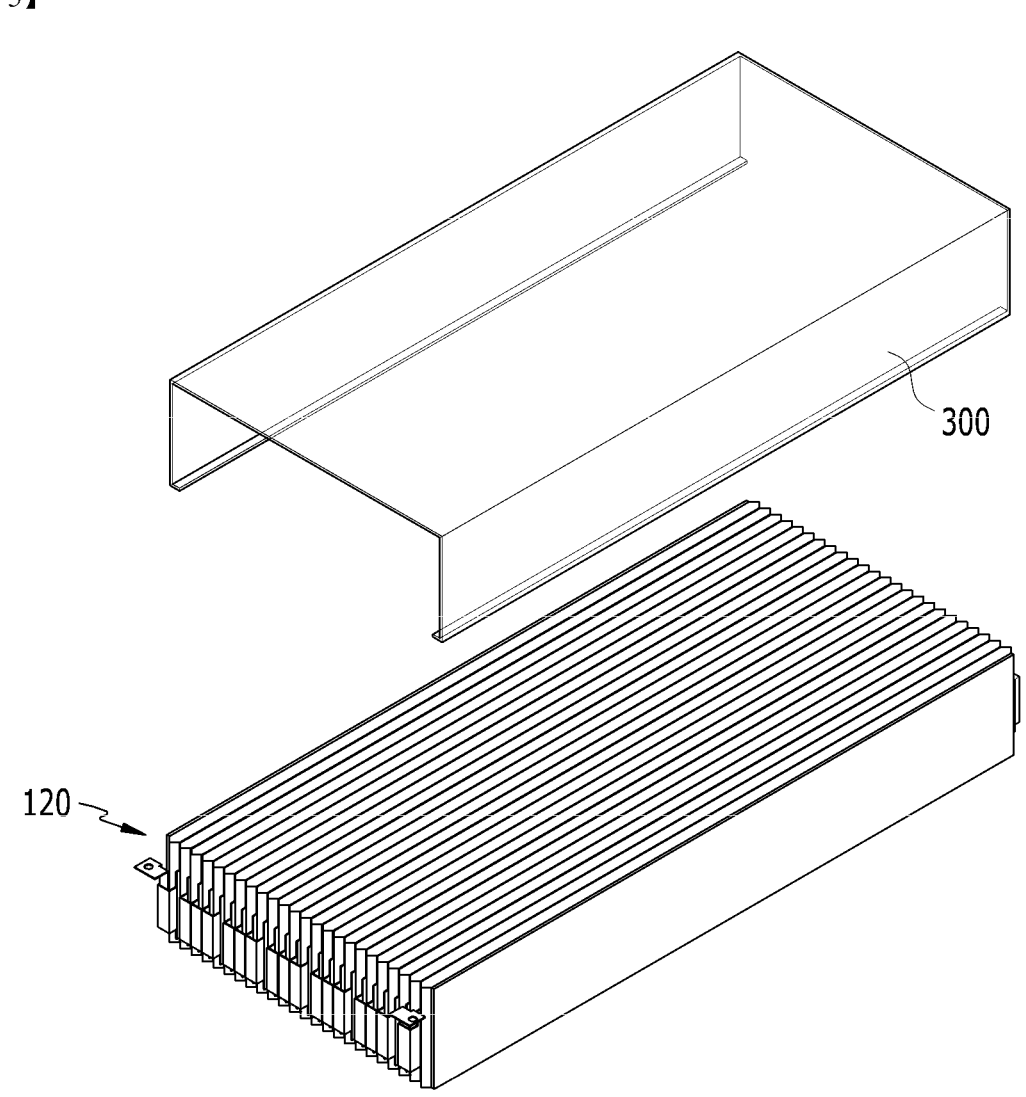

FIG. 6

【FIG. 7】
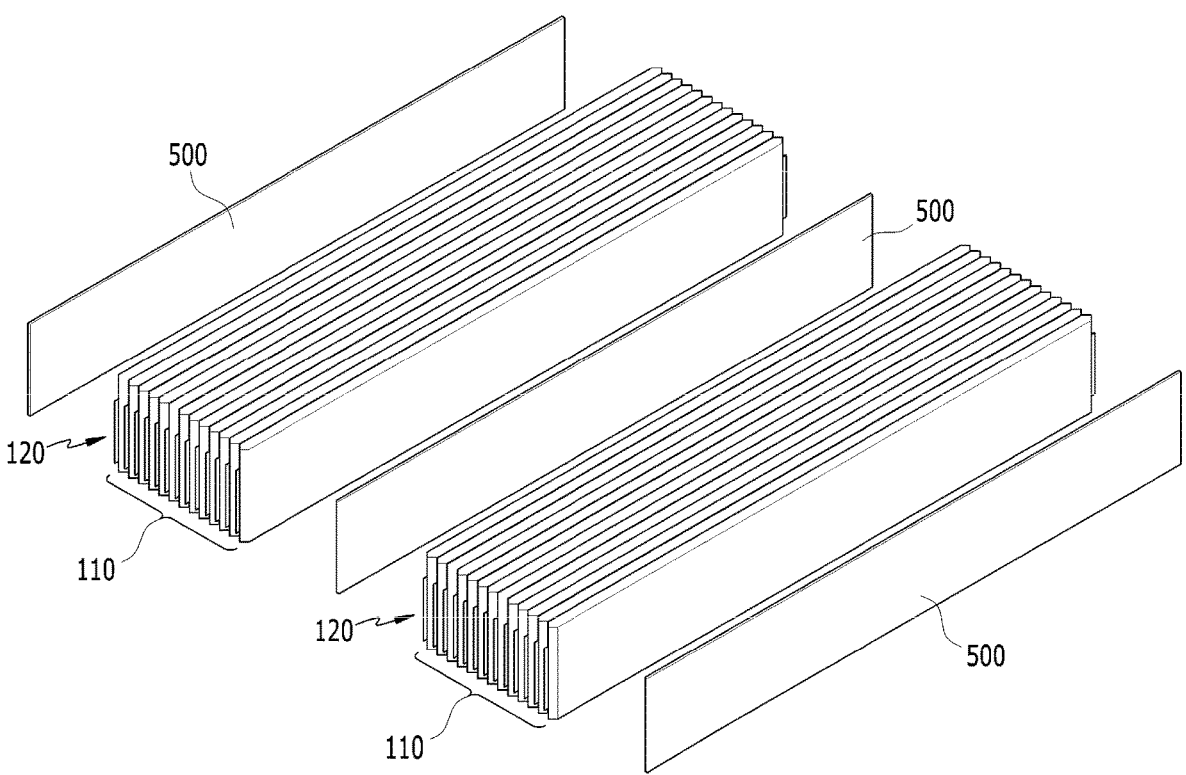

【FIG. 8】
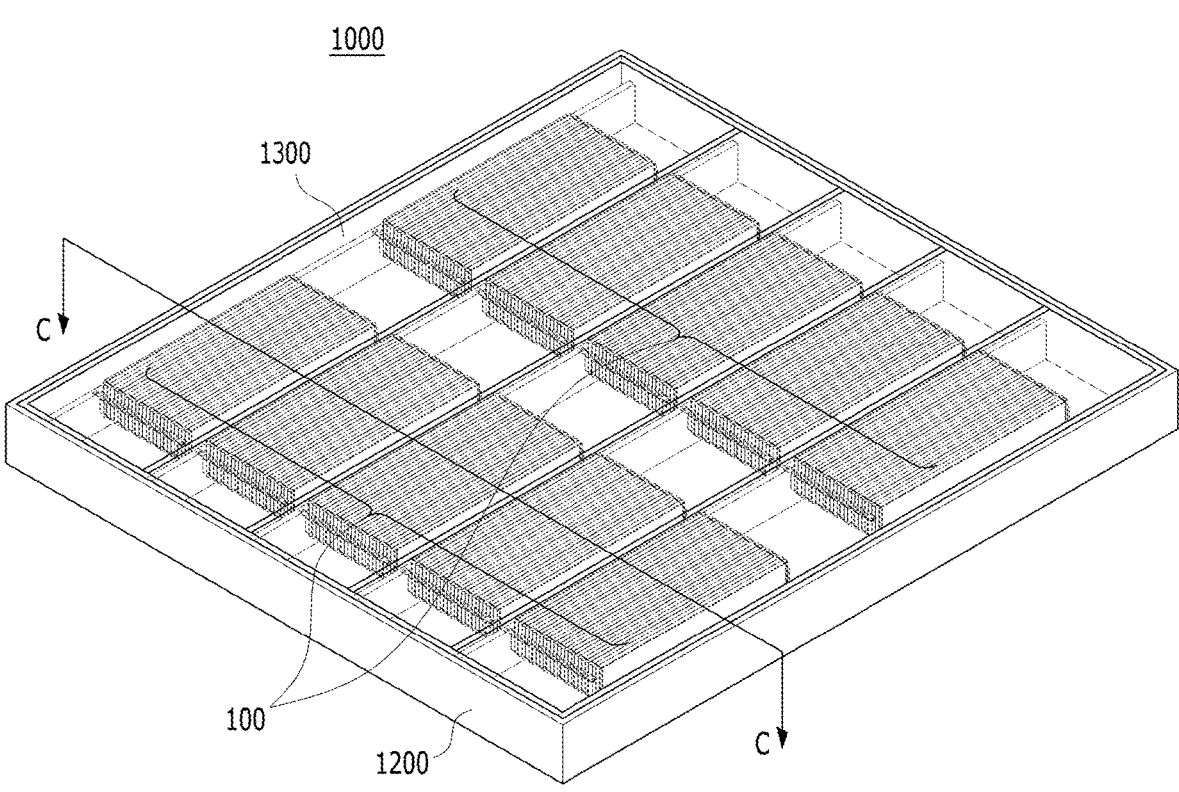

【FIG. 9】
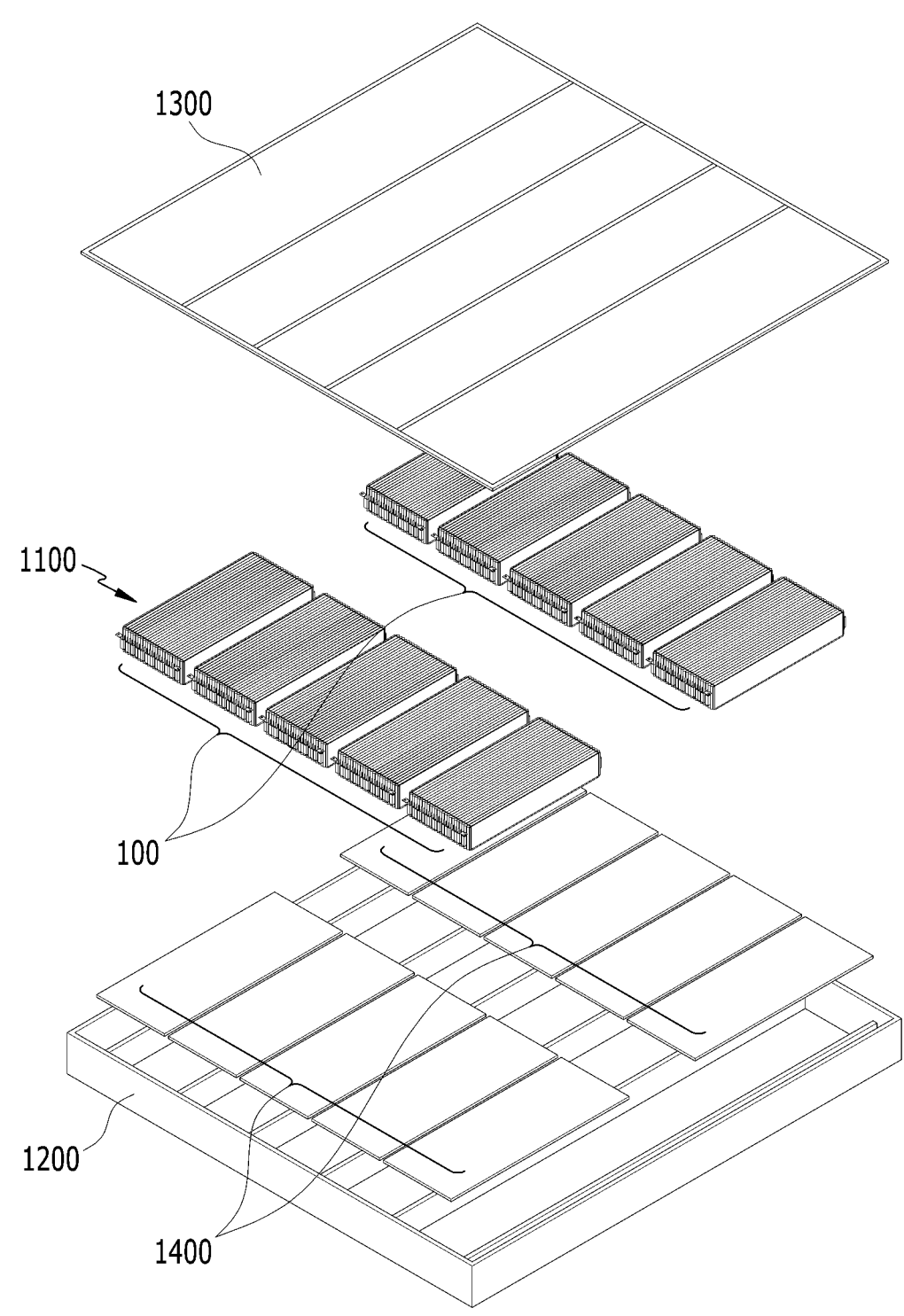

【FIG. 10】
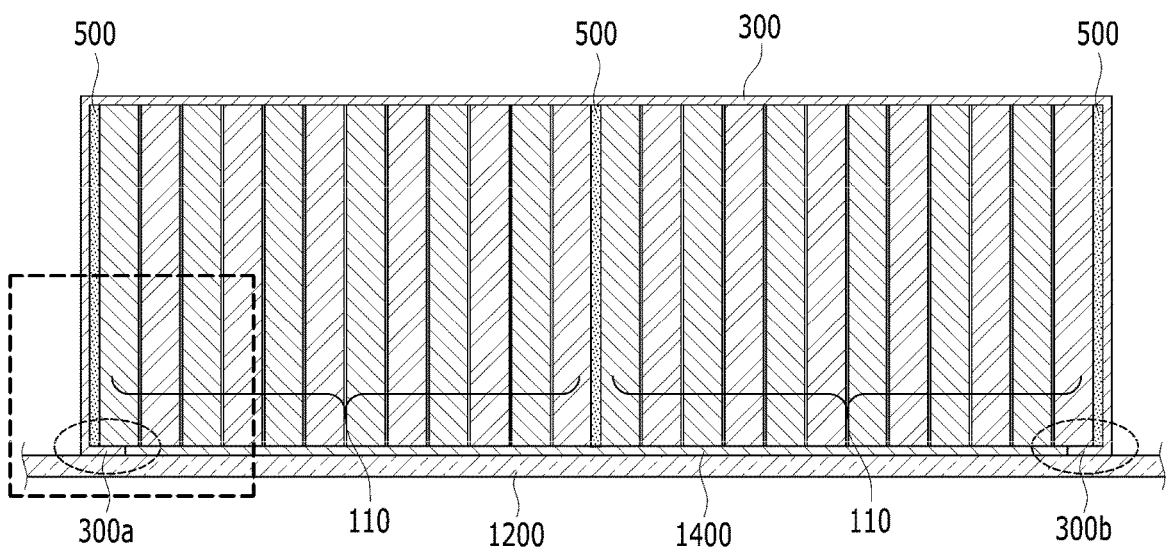
【FIG. 11】
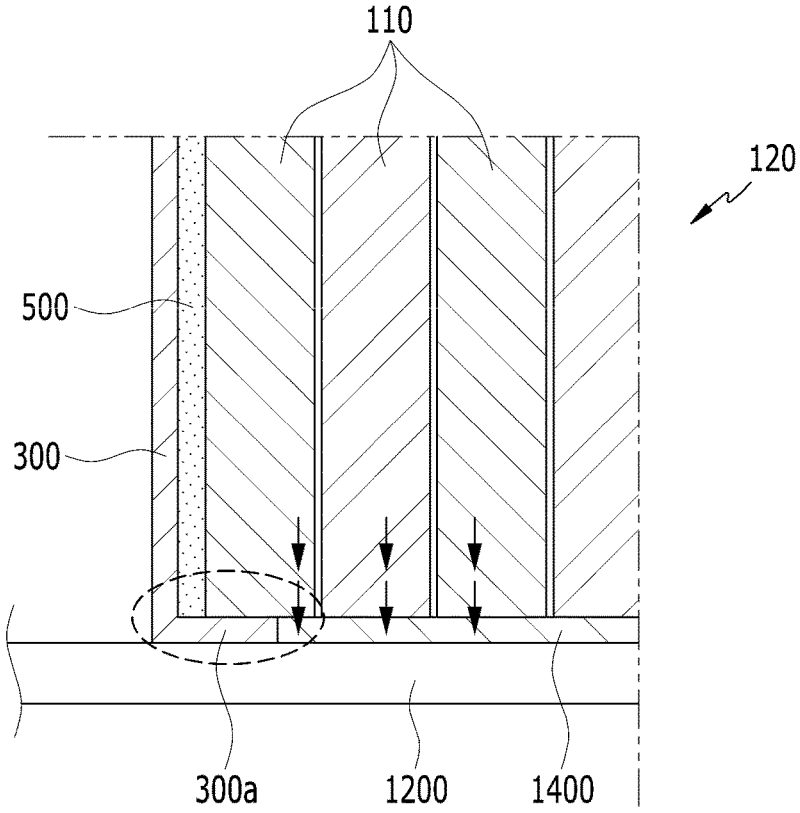

BATTERY MODULE AND BATTERY PACK INCLUDING THE SAME

CROSS CITATION WITH RELATED APPLICATION(S)

This application claims the benefit of Korean Patent Application No. 10-2020-0170442 filed on Dec. 8, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module having improved cooling performance while improving a swelling phenomenon of a battery cell, and a battery pack including the same.

BACKGROUND

Along with the increase of the technological development and demand for a mobile device, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

Since the middle or large-sized battery module is preferably manufactured so as to have as small a size and weight as possible, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame which is opened in its front and rear sides and houses the battery cell stack in an internal space.

FIG. 1 is a perspective view of a conventional battery module. FIG. 2 is an exploded perspective view of the battery module of FIG. 1. FIG. 3 is a view showing a part of a cross-section taken along the cutting line A-A of FIG. 1.

Referring to FIGS. 1 and 2, the conventional battery module 10 includes a battery cell stack 12 in which a plurality of battery cells 11 are stacked in one direction, and an exterior member 30 for housing the battery cell stack 12. Here, the exterior member 30 are opened in its front and rear surfaces, so that the front and back surfaces of the battery cell stack 12 housed in the exterior member 30 are opened.

Here, the battery module 10 is mounted on the thermal conductive resin layer 14 formed on a pack frame member (not shown). Thereby, the conventional battery module 10 is configured such that the exterior member 30 is positioned between the battery cell stack 12 and the thermal conductive resin layer 14.

Referring to FIG. 3, the compression pad is positioned between the battery cell stack 12 and the exterior member 30, but generally, the compression pad has a problem in that it is limited in absorbing deformation in the width direction of the battery module 10.

Referring to FIG. 3, the conventional battery module 10 has a structure that indirectly cools the lower portion of the battery cell stack 12 through the thermal conductive resin layer 14, which is a structure in which heat generated in the battery cell 11 flows to the thermal conductive resin layer 14 via the exterior member 30. Here, the conventional battery module 10 has a problem that heat transfer is inhibited due to an air layer formed between the exterior member 30 and the battery cell stack 12 or between the exterior member 30 and the thermally conductive resin layer 14. Considering that the temperature of the battery cell 11 is one of the factors that limit the output of the battery, a local temperature increase that occurs in the battery cell 11 is highly likely to limit the output of the battery at early stage, and thus this needs to be improved. In addition, as the battery module 10 is recently enlarged, the number of battery cells 11 stacked in the module increases, and a cooling deviation between the battery cells 11 is further deepening.

Therefore, there is a need to develop a battery module that improves a cooling performance against heat generated in the battery cell stack 12 while preventing a swelling phenomenon in the battery cell stack 12, and a battery pack including the same.

DETAILED DESCRIPTION OF THE INVENTION

Technical Problem

It is an object of the present disclosure to provide a battery module having improved cooling performance while improving a swelling phenomenon of a battery cell, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising: a battery cell stack containing a plurality of battery cells stacked along a first direction; and an exterior member that wraps an outer surface of the battery cell stack, in which a central portion of the lower surface of the battery cell stack is opened, wherein a first end part of the exterior member is attached to a first side part of the lower surface of the battery cell stack, and wherein a second end part of the exterior member is attached to a second side part of the lower surface of the battery cell stack.

An outer surface of the exterior member of the battery module is exposed to the outside, and the central portion of the lower surface of the battery cell stack positioned between the first end part of the exterior member and the second end part of the exterior member may be exposed to the outside.

The exterior member may be made of an elastic material.

The exterior member may be formed such that a film of the elastic material wraps the outer surface of the battery cell stack from the first side part of the lower surface of the battery cell stack, and wraps to the second side part of the lower surface of the battery cell stack.

The battery module further comprises a compression pad positioned on each side surface of the battery cell stack, wherein the compression pad is positioned between the exterior member and the outside surface of the battery cell stack, and the exterior member may press the battery cell stack in the first direction.

The exterior member presses an upper surface of the battery cell stack in a second direction, and the second direction may be perpendicular to the first direction.

The second direction may be a width direction of the plurality of battery cells.

The compression pad may be extended along a side surface of the battery cell stack.

According to another embodiment of the present disclosure, there is provided a battery pack comprising the above-mentioned battery module.

The battery pack comprises a lower pack frame on which at least two of the battery modules are mounted, an upper pack frame that covers the upper portions of the at least two battery modules, and a thermal conductive resin layer formed on the lower pack frame, wherein the central portion of the lower surface of the battery cell stack may come into contact with the thermal conductive resin layer.

The lower pack frame comprises a plurality of module regions, and the battery module may be mounted in the module region.

The thermal conductive resin layer is formed on the module region.

The thermal conductive resin layer may have a size equal to the central portion of the lower surface of the battery cell stack.

A side surface of the first end part of the exterior member may come into contact with a first side surface of the thermal conductive resin layer, and a side surface of a second end part of the exterior member may come into contact with a second side surface of the thermal conductive resin layer.

A thermal conductive resin layer may be under the battery cell stack, the thermal conductive resin layer may contact the central portion of the lower surface of the battery cell stack.

Advantageous Effects

According to embodiments of the present disclosure, a battery module which includes an exterior member that wraps the outer surface of the battery cell stack, in which a central portion of the lower surface of the battery cell stack is opened, thereby having improved cooling performance while improving a swelling phenomenon of a battery cell, and a battery pack including the same can be provided.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module;

FIG. 2 is an exploded perspective view of the battery module of FIG. 1;

FIG. 3 is a view showing a part of a cross-section taken along the cutting line A-A of FIG. 1;

FIG. 4 is a perspective view of a battery module according to an embodiment of the present disclosure;

FIG. 5 is an exploded perspective view of the battery module of FIG. 4;

FIG. 6 is a cross-sectional view taken along the cutting line B-B of FIG. 4;

FIG. 7 is an exploded perspective view of a battery cell stack included in the battery module of FIG. 4;

FIG. 8 is a perspective view of a battery pack according to an embodiment of the present disclosure;

FIG. 9 is an exploded perspective view of the battery pack of FIG. 8;

FIG. 10 is a cross-sectional view taken along the cutting line C-C of FIG. 8; and FIG. 11 is an enlarged view showing a part of the cross-sectional view of FIG. 10.

DETAILED DESCRIPTION OF THE EMBODIMENTS

Hereinafter, various embodiments of the present disclosure will be described in detail with reference to the accompanying drawings so that those skilled in the art can easily implement them. The present disclosure can be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Hereinafter, the battery module according to one embodiment of the present disclosure will be described. However, the description herein is made based on the front surface among the front and rear surfaces of the battery module, without being necessarily limited thereto, and even in the case of the rear surface, a description may be given with same or similar contents.

FIG. 4 is a perspective view of a battery module according to an embodiment of the present disclosure. FIG. 5 is an exploded perspective view of the battery module of FIG. 4.

Referring to FIGS. 4 and 5, the battery module 100 includes a battery cell stack 120 in which a plurality of battery cells 110 are stacked in a first direction, an exterior member 300 that wraps the battery cell stack 120, and a sensing member (not shown) that covers the front and rear surfaces of the battery cell stack.

The battery cell stack 120 wrapped in the exterior member 300 is stacked by a plurality of battery cells 110, wherein the battery cell 110 is preferably a pouch type battery cell. The battery cell 110 may be produced by housing the electrode assembly in a pouch case of a laminate sheet containing a resin layer and a metal layer, and then heat-sealing a sealing part of the pouch case. The battery cells 110 may be configured by a plurality of numbers, and the plurality of battery cells 110 are stacked so as to be electrically connected to each other to form a battery cell stack 120.

Next, the exterior member 300 will be described in more detail.

Figure 6:
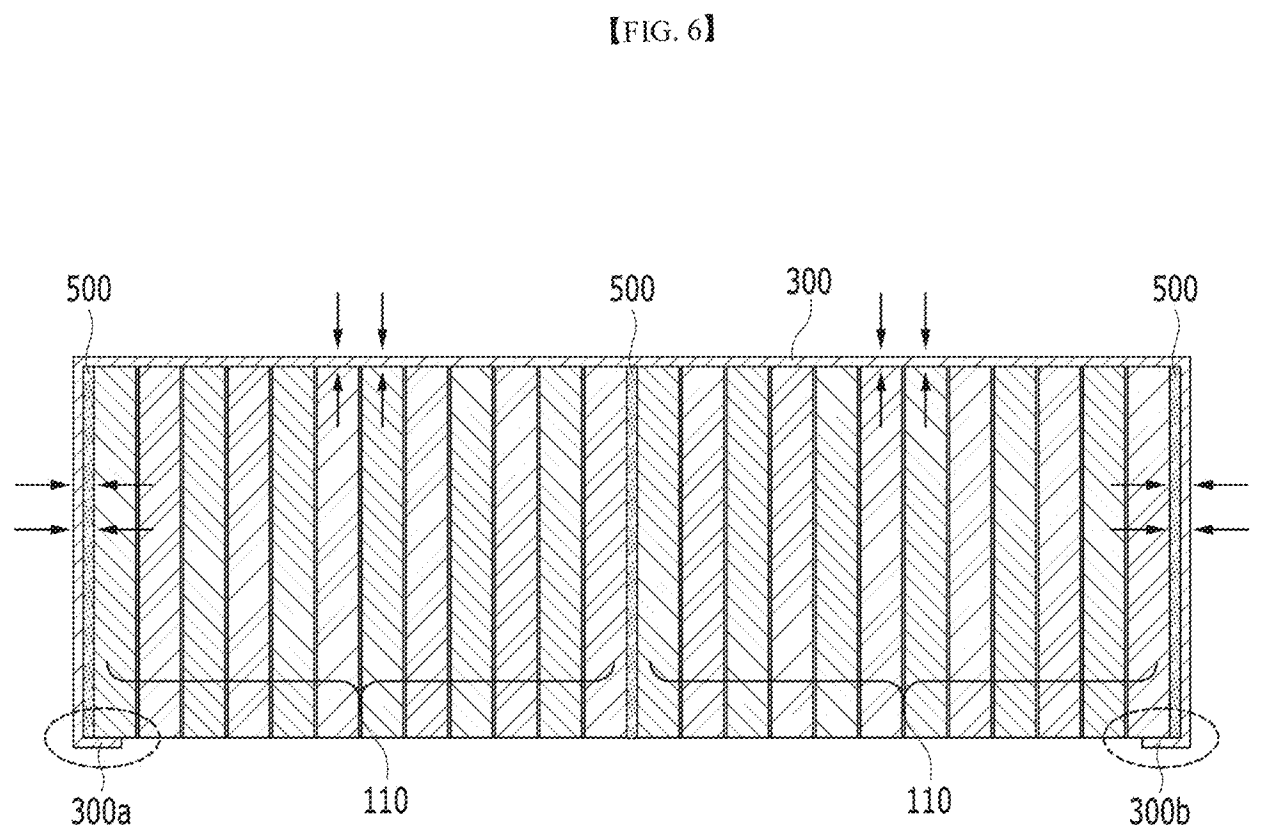

FIG. 6 is a cross-sectional view taken along the cutting line B-B of FIG. 4.

Referring to FIGS. 4 to 6, the exterior member 300 may wrap the outer surface of the battery cell stack 120. The exterior member 300 may wrap the outer surface of the battery cell stack 120, in which a central portion of the lower surface of the battery cell stack 120 is opened. That is, the exterior member 300 wraps both side surfaces and the upper surface of the battery cell stack 120, in which the front and rear surfaces of the battery cell stack 120 are opened, and the central portion of the lower surface may be opened.

More specifically, in the battery module 100 of the present embodiment, one end part 300a of the exterior member 300 is attached to one side part of the lower surface of the battery cell stack 120, and the other end part 300b of the exterior member 300 is attached to the other side part of the lower surface of the battery cell stack 120. That is, the exterior member extends from one end part 300a of the exterior member 300 to the other end part 300b of the exterior member 300 and can wrap both side surfaces, the upper surface, and both side parts of the lower surface of the battery cell stack 120.

Further, the exterior member 300 may be configured such that the outer surface of the exterior member 300 is exposed in a state of wrapping the battery cell stack 120. That is, when the battery module 100 is mounted onto a lower pack frame 1200 of the battery pack in a process described later, the exterior member 300 may come into contact with a lower pack frame 1200. Further, in the exterior member 300, a central portion of the lower surface of the battery cell stack 120 positioned between one end part 300a of the exterior member 300 and the other end part 300b of the exterior member 300 may be exposed to the outside. That is, when the battery module 100 is mounted onto the lower pack frame 1200 of the battery pack in a process described later, the exterior member 300 may be in direct contact with the thermal conductive resin layer 1400 formed on the lower pack frame 1200.

Thereby, in the exterior member 300 of the present embodiment, the central portion of the lower surface of the battery cell stack 120 is opened to the outside, and the thermal conductive resin layer 1400 described later can be in direct contact with the central portion of the lower surface of the battery cell stack 120 to directly cool heat generated in the battery cell stack 120. That is, the exterior member 300 according to the present embodiment can further improve the cooling performance.

Further, the both side surfaces and upper and lower surfaces of the exterior member 300 may each have a size corresponding to the size of the outer surface of the battery cell stack. In one example, the both side surfaces of the exterior member 300 may have a size equal to or smaller than the side surface of the battery cell stack 120. Further, the upper surface of the exterior member 300 may have a size equal to or smaller than the upper surface of the battery cell stack 120. Further, one end part 300a and the other end part 300b of the exterior member 300 are extended along the longitudinal direction of the lower surface of the battery cell stack 120, and may have a size equal to or smaller than the length of the lower surface of the battery cell stack 120.

Thereby, in the present embodiment, the exterior member 300 can press the battery cell stack 120 in a certain direction to wrap the battery cell stack 120. That is, the exterior member 300 presses the battery cells 110 included in the battery cell stack 120 in a certain direction, thereby preventing a swelling phenomenon of the battery cell and improving a dimensional stability of the battery module. In addition, through the process in which the battery cell stack 120 is wrapped in the exterior member 300, the battery cell stack 120 is simultaneously pressed, and so a process of separately pressing the battery cell stack 120 is not required, which can simplify the process and production line.

In one example, the exterior member 300 may be made of an elastic material. The elastic material may be made of at least one of a material such as polyethylene (PE) and polytetrafluoroethylene (PTFE). Here, the exterior member 300 is formed such that a film of an elastic material or a heat shrinkable tube wraps the outer surface of the battery cell stack 120 from one side part of the lower surface of the battery cell stack, and wraps up to the other side part of the lower surface of the battery cell stack 120. As an example, the exterior member 300 may be formed by wrapping the upper and lower surfaces and both side surfaces, which are the outer surfaces of the battery cell stack 120, by a film or a heat shrinkable tube of the elastic material, and then removing a part of the film or heat shrinkable tube that covers the lower surface of the battery cell stack 120. However, without being limited thereto, any material having elasticity capable of sufficiently pressing the battery cell 110 included in the battery cell laminate 120 while effectively absorbing an external impact can be applied without limitation.

Thereby, in the present embodiment, the exterior member 300 can prevent a swelling phenomenon of the battery cell and improve a dimensional stability of the battery module. In addition, the exterior member 300 has an advantage that it has elasticity in itself and thus can minimize deformation in response to a change in the volume of the battery cell 110.

Further, the outer surface of the battery cell stack 120 can be attached to the inner surface of the exterior member 300, respectively. Here, the elastic material included in the exterior member 300 may have an adhesive force by itself. Further, the exterior member 300 and the battery cell stack 120 may be fixed through a frictional force between the inner surface of the exterior member 300 and the outer surface of the battery cell stack 120. Further, a separate adhesive layer may be formed between the exterior member 300 and the battery cell stack 120.

In one example, each of the adhesive layers may be formed of a tape or be coated and formed with an adhesive binder. More preferably, the adhesive layer is coated with an adhesive binder or made of a double-sided tape, so that the battery cell stack 120 and the exterior member 300 can be easily fixed. However, without being limited thereto, any material having adhesive performance capable of fixing between the battery cells 110 or between the battery cells 110 and the exterior member 300 to each other may be applied without limitation.

Thereby, the battery cell stack 120 may be stably housed in the exterior member 300.

Further, referring to FIG. 6, the exterior member 300 presses the battery cell stack 120 in the first direction. More specifically, the first direction may be the width direction of the battery module 100, which may be equal to the stacking direction of the plurality of battery cells 110 in the battery cell stack 120.

Thereby, the exterior member 300 presses the battery cell stack 120 in the same direction as the width direction of the battery module 100 or the stacking direction of the battery cells 110 to effectively prevent a swelling phenomenon of a battery module. In addition, the first compression pad 500 is positioned between the exterior member 300 and the battery cell stack 120 to effectively absorb deformation occurring in the width direction of the battery module 100. Moreover, the lifetime of the battery module 100 can also be improved.

Further, the exterior member 300 presses the upper and lower surfaces of the battery cell stack in the second direction, and the second direction may be perpendicular to the first direction. More specifically, the second direction may be a width direction of the plurality of battery cells 110.

Thereby, the exterior member 300 can be pressed with a predetermined pressure even in the width direction of the battery cell 110 perpendicular to the width direction of the battery module 100, whereby a swelling phenomenon can be effectively prevented even in the width direction of the battery cell 110. Moreover, the lifetime of the battery module 100 can be further improved.

FIG. 7 is an exploded perspective view of a battery cell stack included in the battery module of FIG. 4.

Referring to FIGS. 6 and 7, the battery module 100 according to the present embodiment 1 may be configured such that the compression pad 500 is positioned between the exterior member 300 and the outside surface of the battery cell stack 120. Here, the compression pad 500 may be extended along the outside surface of the battery cell stack 120. Further, the compression pad 500 may have a size equal to or smaller than the outside surface of the battery cell stack 120. Further, both end parts of the compression pad 500 may be in contact with the exterior member 300 or may be wrapped by the exterior member 300.

Further, referring to FIGS. 6 and 7, according to another embodiment of the present disclosure, the battery cell stack 120 includes a first battery cell stack and a second battery cell stack, and a compression pad 500 may be positioned between the first battery cell stack and the second battery cell stack. Further, the compression pad 500 may be extended along the side surfaces of the first battery cell stack and the second battery cell stack.

In one example, the compression pad 500 may be a pad made of a polyurethane material. However, without being not limited thereto, any material capable of absorbing a change in volume during expansion of the battery cell 110 may be applied.

Thereby, the compression pad 500 easily absorbs the expansion generated in the battery cells 110 included in the battery cell stack 120, so that the exterior member 300 can assist in pressing the outer surface of the battery cell stack 120.

FIG. 8 is a perspective view of a battery pack according to an embodiment of the present disclosure. FIG. 9 is an exploded perspective view of the battery pack of FIG. 8.

Referring to FIGS. 8 and 9, the battery pack 1000 according to another embodiment of the present disclosure includes the battery module 100 described above. Meanwhile, one or more of the battery modules 100 can be packaged in the pack cases 1200 and 1300 to form the battery pack 1000.

More specifically, the battery pack 1000 of the present embodiment includes a lower pack frame 1200 on which at least two battery modules 100 are mounted, an upper pack frame 1300 covering the upper portions of at least two battery modules 100, and a thermal conductive resin layer 1400 formed on the lower surface of the lower pack frame 1200. Here, the at least two battery modules 100 are arranged in one direction to form a battery module arrangement body 1100. Further, the lower pack frame 1200 includes a plurality of module regions, and the battery module 100 may be mounted in the module region. Here, as the battery module 100 is mounted in the module region, the central portion of the lower surface of the battery cell stack 120 and the thermal conductive resin layer 1400 may contact each other.

Thereby, heat generated in the battery cell 110 is transferred to a thermal conductive resin layer 1400 that is in direct contact with the central portion of the lower surface of the battery cell stack 120, so that the cooling performance of the battery module 100 can be improved, and a cooling deviation between the battery cells 110 can also be reduced. Moreover, the lifetime of the battery module 100 can be further improved.

As an example, the thermal conductive resin layer 1400 may have a thermal conductive resin applied on each module region of the lower pack frame 1200 before the battery module 100 is mounted on the module region of the lower pack frame 1200. After that, as the thermal conductive resin is cured, the thermal conductive resin layer 1400 can be formed.

Thereby, as the thermal conductive resin is cured, the lower surface of the battery module 100 can be stably fixed to the thermal conductive resin layer 1400.

FIG. 10 is a cross-sectional view taken along the cutting line C-C of FIG. 8. FIG. 11 is an enlarged view showing a part of the cross-sectional view of FIG. 10.

More specifically, referring to FIGS. 10 and 11, the thermal conductive resin layer 1400 may be formed in each of the module regions formed in the lower pack frame 1200. Further, the thermal conductive resin layer 1400 may have the same size as the central portion of the lower surface of the battery cell stack 120.

Thereby, in each battery module 100 mounted on the lower pack frame 1200, heat generated in the battery cells 110 can be respectively transferred to the thermal conductive resin layer 1400 that is in direct contact with the central portion of the lower surface of the battery cell stack 120. That is, the cooling performance of each battery module 100 is improved without generating heat propagation between the battery modules 100, and a cooling deviation between the battery cells 110 in each battery module 100 can also be reduced. Moreover, the lifetime of the battery module 100 can be further improved.

Further, the side surface of the one end 300a of the exterior member 300 and one side surface of the thermal conductive resin layer 1400 are in contact with each other, and the side surface of the other end portion 300b of the exterior member 300 may be in contact with the other side surface of the thermally conductive resin layer 1400.

Thereby, as the thermal conductive resin is cured, one end part 300a and the other end part 300b of the exterior member 300 positioned on the lower surface of the battery module 100 can be stably fixed to the thermal conductive resin layer 1400.

The above-mentioned battery module and battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and improvements can be devised by those skilled in the art, without departing from the spirit and scope of the principles of the invention defined in the appended claims.

DESCRIPTION OF REFERENCE NUMERALS

100: battery cell
110: battery cell
120: battery cell stack
300: exterior member
500: compression pad

The invention claimed is:

1. A battery module comprising:

a battery cell stack containing a plurality of battery cells stacked along a first direction;

an exterior member that wraps an outer surface of the battery cell stack, in which a central portion of a bottom surface of the battery cell stack is opened;

a first end part of the exterior member being attached to a first side part of the bottom surface of the battery cell stack;

a second end part of the exterior member being attached to a second side part of the bottom surface of the battery cell stack; and a thermal resin extending between the first end part and the second end part, wherein the lower surface of the battery stack directly contacts the thermal resin, the first end part and the second end part.

2. The battery module according to claim 1, wherein:

an outer surface of the exterior member of the battery module is exposed to the outside.

3. The battery module according to claim 2, wherein:

the exterior member is made of an elastic material.

4. The battery module according to claim 3, wherein:

the exterior member is formed such that a film of the elastic material wraps the outer surface of the battery cell stack from the first side part of the bottom surface of the battery cell stack, and wraps up to the second side part of the bottom surface of the battery cell stack.

5. The battery module according to claim 1, further comprising a compression pad positioned on each side surface of the battery cell stack, wherein the compression pad is positioned between the exterior member and the outside surface of the battery cell stack, and the exterior member presses the battery cell stack in the first direction.

6. The battery module according to claim 5, wherein:

the exterior member presses an upper surface of the battery cell stack in a second direction, and the second direction is perpendicular to the first direction.

7. The battery module according to claim 6, wherein:

the second direction is a width direction of the plurality of battery cells.

8. The battery module according to claim 5, wherein:

the compression pad is extended along a first side surface of the battery cell stack.

9. A battery pack comprising the battery module as set forth in claim 1.

10. The battery pack according to claim 9, wherein the battery pack comprises:

a lower pack frame on which at least two of the battery modules are mounted, an upper pack frame that covers the upper portions of the at least two battery modules.

11. The battery pack according to claim 10, wherein:

the lower pack frame comprises a plurality of module regions, and the battery module is mounted in the module region.

12. The battery pack according to claim 11, wherein:

the thermal conductive resin layer is formed on the module region.

13. The battery pack according to claim 12, wherein:

the thermal conductive resin layer has a size equal to the central portion of the bottom surface of the battery cell stack.

\*    \*    \*    \*    \*